(12) United States Patent
O'Donnell

(10) Patent No.: US 7,254,895 B1
(45) Date of Patent: Aug. 14, 2007

(54) TARGET HOLDER

(76) Inventor: James O'Donnell, 53168 Judy Creek Blvd., Granger, IN (US) 46530

( * ) Notice: Subject to any disclaimer, the term of this patent is extended or adjusted under 35 U.S.C. 154(b) by 195 days.

(21) Appl. No.: 11/162,964

(22) Filed: Sep. 29, 2005

(51) Int. Cl.
  *G01C 15/06* (2006.01)
  *B25B 5/04* (2006.01)
(52) U.S. Cl. .................................... 33/293; 248/231.51
(58) Field of Classification Search ................ 33/293, 33/408, 409, 410; 269/41, 42; 248/231.51, 248/316.5
  See application file for complete search history.

(56) References Cited

U.S. PATENT DOCUMENTS

| | | | | |
|---|---|---|---|---|
| 2,941,557 A | * | 6/1960 | Baprawski | 269/41 |
| 3,349,494 A | * | 10/1967 | Blake | 33/410 |
| 4,021,516 A | * | 5/1977 | Stevenson | 269/41 |
| 4,369,957 A | * | 1/1983 | Williams | 269/41 |
| 4,631,833 A | * | 12/1986 | Moye | 33/408 |
| 4,799,639 A | * | 1/1989 | Riley | 248/231.51 |
| 4,887,784 A | * | 12/1989 | Kayali | 248/231.51 |
| 5,478,041 A | * | 12/1995 | Mayne | 248/231.51 |
| 5,992,836 A | * | 11/1999 | Howe | 269/41 |
| 2005/0121845 A1 | * | 6/2005 | Bries | 269/41 |

* cited by examiner

*Primary Examiner*—G. Bradley Bennett
(74) *Attorney, Agent, or Firm*—Leo H. McCormick

(57) ABSTRACT

A device for holding a target adjacent first and second intersecting surfaces of a structure to assist in measuring a distance from an instrument to the target. The device has first and second levers that are joined by a pin that has a section that extends above the levers to receive the target. A force is applied to the first and second levers to bring non-skid pads thereon into engagement with the intersecting surfaces. The target is thereafter rotated into parallel alignment with the second surface and the instrument is aligned with the first surface. A signal transmitted from the instrument is reflected from the target to provide a direct measurement of the distance from the instrument to the target.

14 Claims, 2 Drawing Sheets

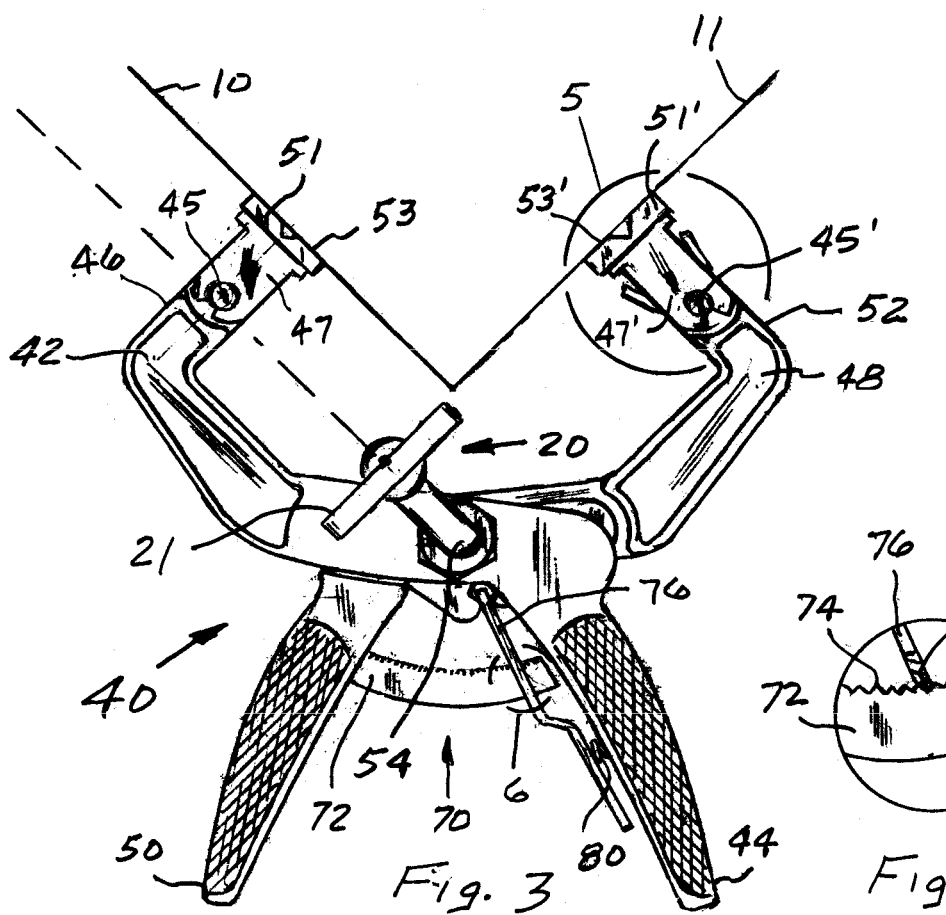
Fig. 3
Fig. 6
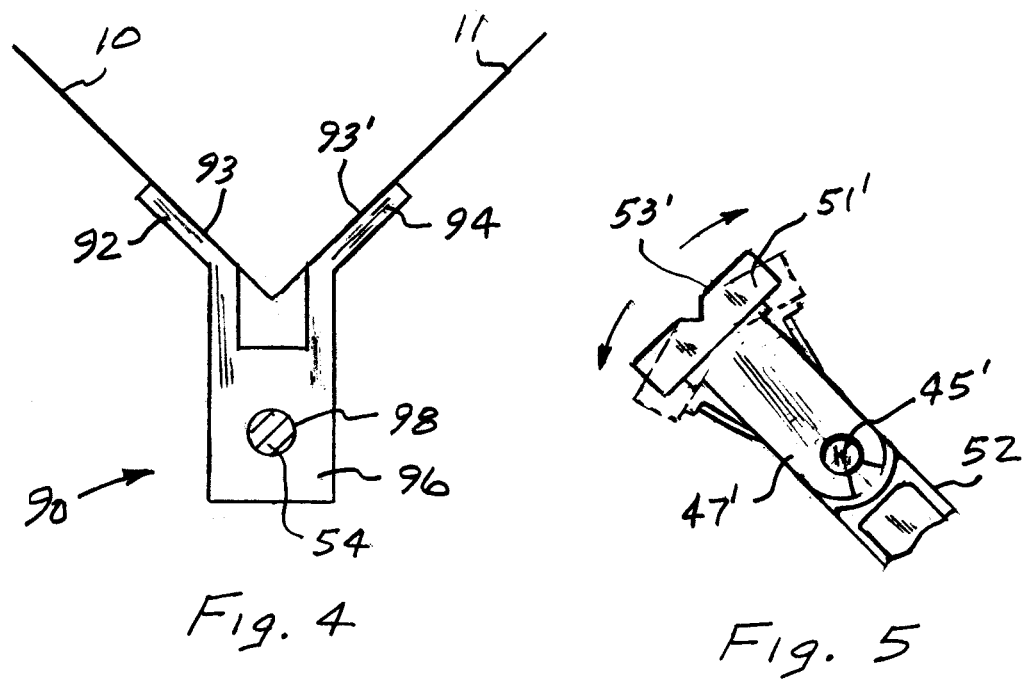
Fig. 4
Fig. 5

TARGET HOLDER

This invention relates to a clamping device for holding a target on a surface of a building to assist in measuring a distance from an instrument to the target.

BACKGROUND OF THE INVENTION

In surveying a piece of property it is common for a single operator to use a laser measuring instrument that is positioned at a first location to obtain a distance to a target on a prism pole at a second position. The laser measuring instrument emits a fan-shaped beam to initially locate the target and through a radio system uses a signal that is reflected from a target to calculate the distance and often times an elevation difference with respect to the instrument and the target. This system is completely adequate in open fields where a prism pole may be stuck in the ground however when such a system is used to measure the dimensions of a house or building it may not always be possible to insert the pole into the ground at a location adjacent a side wall due to a sidewalk or the foundation of the building. It has been suggested that the target be made into an A shaped member that is self standing. Unfortunately the target face may not always be parallel with the surface of the building for which a measurement is desired and as a result an accurate measurement of distance may not be obtained. In order to obtain an accurate measurement it has been suggested to tape a first target and a second target onto a building surface and thereby obtain first and second distance measurements from the instrument and the angle between the first and second targets with a computer in the instrument using this data to accurately define the distance between the first and second targets. This system, while offering a way of accurately measuring distance, would require an operator to continually tape and reset the targets and, in addition, the computer in the instrument must have a capability of measuring an angle between the targets in calculating the distance.

SUMMARY OF THE INVENTION

The present invention provides a device for easily positioning a target on a surface of a building in order to measuring a parallel distance between the target and an instrument.

In more particular detail, the device of the present invention for positioning a target onto a surface of a building is distinguished by a first lever that has a first end and a second end and a second lever that has a first end and a second end that are joined together by a pin to define a pivot point. The pin has a first section that extends above the pivot point to receive the target. When a force is applied to the first end of the first and second levers the second ends thereof pivot about the pin and transmit an actuation force that brings the second end of the first and second levers into engagement with intersecting first and second surfaces on the building at a point selected by an operator. A locking arrangement that is connected to the first and second levers sustains the actuation force such that the second end of the levers remains on the first and second intersecting surfaces. Once the device is attached to the intersecting surfaces, the target is placed on the first section of the pin and thereafter selectively rotated to bring a face thereon into parallel alignment with one of the first and second intersecting surfaces while the instrument is located in alignment with the other of the intersecting surfaces. A signal that is sent from the instrument is returned from the target along a path that is parallel with the other of the intersecting surface to provide an accurate measurement of distance between the target and the instrument.

An advantage of the invention resides in an ability of an individual to position a target in order to accurately measure a distance from a first point to a second point through a laser instrument.

A further advantage of the invention resides in an ability to easily move a target with respect to a surface in order to measure a length of the surface.

BRIEF DESCRIPTION OF THE DRAWINGS

FIG. 3 is a view taken along lines 3-3 of FIG. 2;

FIG. 4 is a view taken along lines 4-4 of FIG. 2;

FIG. 5 is a view taken along circumscribed line 5 of FIG. 3; and

FIG. 6 is an enlarged view of the circumscribed portion 6 of the locking mechanism of FIG. 3.

DETAILED DESCRIPTION

Figure 1:
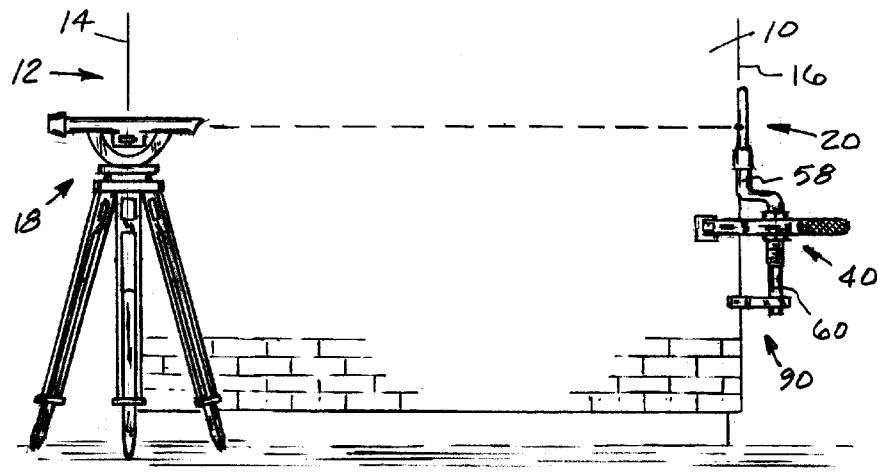
FIG. 1 is a side view of a building wherein an instrument is depicted as being located to measure a distance to a target that is located at an intersecting point of a wall, the target being retained at the intersecting point through the device of the present invention.

A wall 10 for building 12 is illustrated in FIG. 1 having a first side 14 and a second side 16. An instrument 18 of a type manufactured by Leica or Stanley that have the capability of directing a laser beam toward a target 20 that is reflected back from the target 20 to measure a distance between the instrument 18 and the target 20. With the instrument 18 set up in a manner as illustrated along side of the wall 10 and perpendicular to the first side 14 a laser beam is directed along a path that is parallel to wall 10 such that the reflected signal when integrated into an electronic control unit (ecu) within the instrument represents an accurate length of the distance between the first side 14 and the second side 16.

Figure 2:
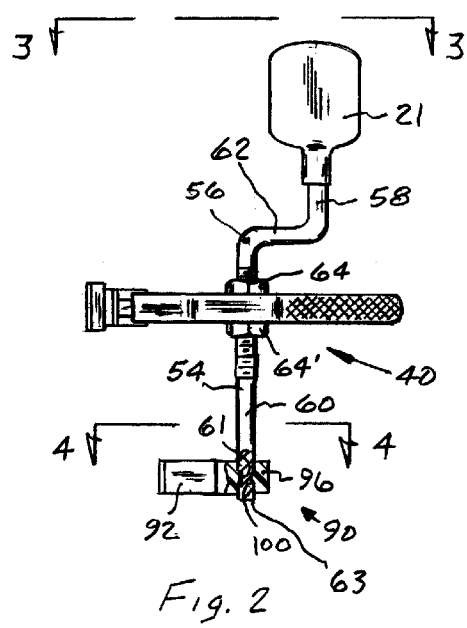
FIG. 2 is an enlarged side view of the device of FIG. 1.

According to the present invention, the target 20 is located at and held onto a point defined by the intersection of wall 10 with wall 11 by a clamp arrangement 40 that may best illustrated in FIGS. 2 and 3.

The clamp arrangement 40 is designed such that it may easily moved along the intersection of between walls 10 and 11 and held there for a time period in order to hone a signal from the instrument 18 onto the target 20. In more detail, the clamp arrangement 40 is defined by a first lever 42, having a first end 44 and a second end 46, that is connected to a second lever 48, that also has a first end 50 and a second end 52, by a pin 54 that extends through the first 42 and second 48 levers to define a pivot point 56. Pivot pin 54 has a first section 58 that is offset from a second section 60 by an offset section 62 with the second section 60 extending through the first lever 42 and the second lever 48. Nuts 64, 64' are tightened on threads on the second section 60 such that the first lever 42 is held against the second lever 48 and yet the first section 58 thereof may be rotated with respect to the pivot point 56.

The second end 46 of the first lever 42 and the second end 52 on the second lever 48 each have a cylindrical projection 45,45' thereon that is parallel with the pivot pin 54 and is designed to receive a clip 47,47' on a projection that extends from a pad 51,51', as illustrated in FIG. 5. The cylindrical projection 45,45' allow a face 53,53' on pads 51,51' to engage a surface with full contact. Face 53 on pad 51 and face 53' of pad is made of a non-skid material, such as rubber, such that a high coefficient of friction is obtained between face 53,53' and an engagement surface.

The second section 60 of the pivot pin 54 may extend below the first 42 and second 48 levers a distance sufficient for the attachment of a stabilizer 90. The stabilizer 90, as best shown in FIGS. 2 and 4, is defined by first 92 and second 94 arms that extend from a base 96 and define a perpendicular relationship with one another corresponding to a similar relationship that may exist between wall 10 and wall 11 (although other angular alignments are foreseen). Base 96 has an opening 98 with a groove 100 therein for receiving a rib 61 that is located adjacent the end 63 of the second section of pivot pin 54. The stabilizer 90 is pushed onto the second section 60 such that rib 61 is located in groove 100 while the second section 60 engages the base 96 such that the first 92 and second 94 arms are in perpendicular alignment with the second section 60 of pivot pin 54 but may still rotate with respect to the pivot pin 54. As with pads 51,51', a layer of non-skid material 93,93' may respectively be applied to the first 92 and second 94 arms such that on engagement with a surface, sliding movement is resisted.

The clamp arrangement 40 is further distinguished by a locking mechanism 70 define by an arcuate disc 72 that is fixed to lever 48. Arcuate disc 72 has a first plurality of teeth 74 thereon that are designed to mesh with a surface edge 78 located on a lever 76 that is pivotally connected to lever 42, see FIG. 6. The surface edge 78 are maintained in engagement with teeth 74 through a force applied by a spring 80. When a force is applied to lever 76, spring 80 is compressed and the surface edge 78 is moved away from the plurality of teeth 74 to release the locking arrangement and thereafter allow the first lever 42 to move independently of the second lever 48.

MODE OF OPERATION OF THE INVENTION

When it is desirable to determine the length of a wall 10 such as illustrated in FIG. 1, and operator would set an instrument 18 (instrument is illustrated as being located on a tripod but a hand instrument is envisioned and may be preferred for most applications) is aligned with the first side 14. Thereafter, the clamp arrangement 40 is placed along a point of the intersection of the first wall 10 and a second wall 11. An application force to the first end 44 of the first lever 42 and the first end 50 of the second lever 48 such that the first lever 42 and second lever 48 pivot on pin 54 to respectively bring the pads 51,51' on second ends 46 and 52 toward and into engagement with a first surface on wall 10 and the second surface on wall 11. As the first 42 and second 48 levers move toward each other the surface edge 78 resiliently moves over the first plurality of teeth 74 to hold and sustain the effect of the actuation force on the respective engagement of pads 51,51' with the first surfaces on wall 10 and the second surface on wall 11. The engagement relationship of the clip 47,47' with the corresponding cylindrical projection 45,45' on the first lever 42 and second lever 48 allow pads 51,51' to rotate with respect to the first surface on wall 10 and the second surface on wall 11 such that the actuation force as transmitted through levers 42 and 48 is essentially directly applied along a plane perpendicular to the first surface and second surface to hold the pads 51,51' in contact with the first surface and second surface.

Once the clamp arrangement 40 is attached to the building 12, a target 20 having a highly reflective face 21 is placed on the first section 58 of pivot pin 54 and the first section 58 is thereafter rotated such that a face 21 thereon is aligned with a plane that extends from the second wall 11 as illustrated in FIG. 3.

A signal is sent from the instrument 18 that is reflected back to the instrument and integrated by an ecu in the instrument 18 to provide a measurement representing a distance from the first side 14 to the second side 16 of wall 10.

In some instances where the weight of the target 20 may act on the clamp arrangement 40 and affect the holding capability of the coefficient of friction between pads 51,51' and the first and second surfaces it may be desirable to attach a stabilizer 90 to end 63 of the second section 60 of pin 54. The base 96 is pushed onto the second section 60 such that a rib 61 is located in groove 100, see FIG. 2. Arms 92 and 94 are designed to respectively engage the first section of wall 10 and the second section of wall 111 such that resistance is provided against any overturning moment by the weight of the target 20 and the engagement of pads 51,51' with the first surface on wall 10 and the second surface on wall 11 holds the first section 58 of pivot pin 54 in a parallel alignment with the intersection of the first walls 10 and second wall 11.

What is claimed is:

1. A device for positioning a target adjacent first and second intersecting surfaces of a structure comprising:
   a first lever having a first end and a second end;
   a second lever having a first end and a second end;
   a pin that extends through said first and second levers to define a pivot point, said pin having a first section that is offset from a second section by an offset section with the target being located on said first section, said first end of said first and second levers on receipt of an input force causing said first and second levers to pivot about said pin and transmit an actuation force that correspondingly moves the second end of said first and second levers into engagement with said first and second intersecting surfaces on the structure; and
   locking means connected to said first and second levers to sustain said actuation force and thereby hold said second end of said first and second levers onto the first and second intersecting surfaces, said first section of said pin thereafter being selectively rotated with respect to said second section to bring a face on the target into parallel alignment with one of said first and second intersecting surfaces.

2. The device as recited in claim 1 wherein said selectively rotation about the pivot point brings the face on the target into a plane that is aligned with the other of said first or second intersecting surfaces.

3. The device as recited in claim 2 further including first and second pads that are respectively located on the second end of said first and second levers, said first and second pads each having a clip thereon that snaps onto a surface on said second end such that a face on said pad may pivot thereon on engaging with a corresponding first and second intersecting surface such that an engaging force is applied thereto along a plane that is substantially perpendicular to the intersecting surface.

4. The device as recited in claim 3 wherein said second section of said pin extends beyond the pivot point to receive a stabilizer member, said stabilizer member engaging a point on the intersection of the first and second intersecting surfaces to provide resistance to any moment that would move the target from the alignment with respect to the intersecting surface.

5. The device as recited in claim 4 wherein said target is made of a reflective material to return a signal to an instrument through which a distance is calculated with respect to a plane that is parallel to the surface.

6. The device as recited in claim 5 wherein said locking means includes an arcuate disc fixed to said lever and having a plurality of teeth and a third lever connected to said pin and having a surface edge thereon that resiliently engage said plurality of teeth, said third lever being moved as the first lever moves toward the second lever in response to the actuation force, and release means connected to said third lever to disengage surface edge from the plurality of teeth and thereafter allow the first end of the first and second levers to expand and terminate the actuation force.

7. The device as recited in claim 6 wherein said first and second pads each have a face covered with a non-skid material to assist in the retention on said first and second intersecting surfaces.

8. A device for positioning a target on first and second intersecting surfaces of a structure comprising:
   a first lever having a first end and a second end;
   a second lever having a first end and a second end;
   a pin that extends through said first and second levers to define a pivot point, said pin having a first section that extends above the pivot point to receive the target, said first end of said first and second levers on receipt of an input force causing said first and second levers to pivot about said pin and transmit an actuation force that correspondingly moves the second end of said first and second levers into engagement with said first and second intersecting surfaces on the structure; and
   locking means connected to said first and second levers to sustain said actuation force and respectively hold said second end of said levers onto the first and second intersecting surfaces, said target thereafter being selectively rotated on said pin to bring a face thereon into parallel alignment with one of said first and second intersecting surfaces.

9. The device as recited in claim 8 wherein said target is made of a reflective material that returns a signal from an instrument along a plane that is parallel to the first surface to provide data from which a measurement may be calculated as to the linear distance from the instrument.

10. The device as recited in claim 9 wherein said pin includes a first section that is offset from the pivot point such that said first section is rotated with respect to said pivot point to selectively align the target with one of the first and second intersecting surfaces.

11. The device as recited in claim 10 wherein said pin includes a second section that extends therefrom for receiving an alignment pad to provide vertical resistance to a moment relating to vertical movement of said pads such that the target is stationary.

12. The device as recited in claim 11 wherein said first and second pads have a non-skid surface to enhance the engagement with the first and second surface.

13. The device as recited in claim 12 wherein said locking means includes a release mechanism to allow the first end of said first and second levers to expand when an operator desires to move the device.

14. The device as recited in claim 13 wherein said alignment pad is connected to said second section through a snap connection.

* * * * *